United States Patent [19]
Ashby

[11] Patent Number: 5,555,652
[45] Date of Patent: Sep. 17, 1996

[54] LAND CLEARING APPARATUS

[76] Inventor: Alan Ashby, 7263 Daisy St., Springfield, Oreg. 97478

[21] Appl. No.: 268,637

[22] Filed: Jun. 30, 1994

[51] Int. Cl.⁶ .............................. B27C 9/00; A01G 23/08
[52] U.S. Cl. ................................................ 37/189; 37/302
[58] Field of Search ................................ 37/94, 189, 302;
56/328.1; 144/2 N, 27, 34 R, 3 D, 241, 243

[56] References Cited

U.S. PATENT DOCUMENTS

| | | | |
|---|---|---|---|
| 2,959,201 | 11/1960 | Tourneau | 37/302 X |
| 3,198,224 | 8/1965 | Hiley. | |
| 3,570,566 | 3/1971 | McCreery | 144/2 N |
| 4,041,996 | 8/1977 | Grover | 37/302 X |
| 4,077,450 | 3/1978 | Ackerman. | |
| 4,180,107 | 12/1979 | Grover | 144/2 N |
| 4,271,879 | 6/1981 | Shivers, Jr. et al.. | |
| 4,402,352 | 9/1983 | Hodges. | |
| 4,690,183 | 9/1987 | Eilertson. | |
| 4,709,736 | 12/1987 | Bellars. | |
| 4,848,423 | 7/1989 | Yoder. | |
| 5,103,882 | 4/1992 | Milbourn | 144/34 R |
| 5,144,762 | 9/1992 | Robinson | 37/457 |
| 5,158,126 | 10/1992 | Lang | 144/2 N X |

OTHER PUBLICATIONS

Brochure re: Slashblaster (undated).
Brochure re: RAM SR 1000 Stump 'Eater'(undated).
Brochure re: Lang Wheel Grinder (undated).
Brochure re: Excavator Mounted Stump Mill (undated).
Brochure re: Beat the Competition to the Crunch (undated).

Primary Examiner—Terry Lee Melius
Assistant Examiner—Robert Pezzuto
Attorney, Agent, or Firm—Kolisch, Hartwell, Dickinson, McCormack & Heuser

[57] ABSTRACT

A land clearing apparatus that includes a rotating land clearing rasp used to shred trees, brush and debris. A conventional excavator can be used to provide a movable platform for carrying the rasp over the land to be cleared, and provides the motive power to drive the rasp. The rasp includes a rotating drum that has a plurality of cutters distributed on its outer surface, so that the cutters can be used to engage debris and vegetation when the drum is rotated. Each cutter includes a connector that connects the cutter to the drum. The connector includes joinder structure that is oriented to be primarily under compressive loads, not shear loads. In alternative embodiments of the invention, each cutter can have a plurality of indexable tips so that, as each tip wears, the cutter can be indexed to present a fresh tip. In addition, the connector between the cutter and the drum can be provided with a wear indicator to aid in determining when to replace the cutter, and the apparatus can include a pivot that allows the drum to be operated in a first position substantially perpendicular to the excavator, and a second position substantially parallel to the excavator.

30 Claims, 10 Drawing Sheets 5,555,652

LAND CLEARING APPARATUS

FIELD OF THE INVENTION

This invention relates generally to an apparatus for clearing brush, trees and debris from land, and more particularly to a rotating rasp with protruding teeth for chewing such vegetation and debris into shredded material. The invention is frequently used in rugged and remote terrain, in which a multi-purpose, highly durable and easily reparable apparatus is essential for efficient operation. For example, the apparatus can be used by itself to clear a primitive road directly through forested terrain.

BACKGROUND ART

It has long been known that rotating machinery can be used to clear specific types of vegetation and debris from land. For example, a rotating stump eradicator is shown in U.S. Pat. No. 4,041,996, but its use is limited to removing stumps and roots. It would not clear standing trees or brush from land effectively. Furthermore, its design is such that it is very difficult to maintain because its cutting elements must be completely removed and replaced when broken, and are attached to the rotating drum such that they are difficult to remove. Accordingly, there is a need for a land-clearing apparatus that handles both large and small debris in a quick and safe fashion, as well as one that is easily field maintainable.

SUMMARY OF THE INVENTION

The present invention is a land clearing apparatus that includes a rotating land clearing rasp having multiple cutting teeth, more generally referred to as cutters, for engaging and shredding objects on and in the land. The rasp is carried on a conventional excavator so that it can be moved over the land to be cleared. The excavator also provides the motive power to rotate the rasp.

The rasp includes releasable joinder structure that releasably connects each cutter to the drum. The securing portion of the joinder structure is easily accessible so that a cutter can be joined to and removed from the drum in the field. This is important because the cutters are subjected to extreme abuse in the field, and are thus in frequent need of replacement or adjustment. Furthermore, the joinder structure is oriented to be primarily under compressive loads, not shear loads, which has been found to lengthen the useful life of the joinder structure and simplify the joining and removing of the cutter to and from the drum.

In alternative embodiments of the invention, each cutter is provided with a plurality of indexable tips so that, as each tip wears, the cutter can be indexed to present a fresh tip. The design of the joinder structure makes this indexing more convenient because the cutter is easily loosened from the drum, rotated to its new position and then retightened.

The joinder structure can also be provided with a wear indicator to aid in determining when to replace the cutter. This makes maintenance of the rasp more predictable, and provides some advanced warning of damage that may be difficult or impossible to repair in the field.

Yet another aspect of the invention is a pivot that pivots the rasp from a first position substantially perpendicular to the arm of the excavator to a second position substantially parallel to the arm. This allows the rasp to be used on various terrain and for various functions, as described in more detail below.

BRIEF DESCRIPTION OF THE DRAWINGS

FIG. I is a right side elevation of the land clearing apparatus of the present invention, showing an excavator with an articulated arm on the outer end of which is mounted a land clearing rasp;

FIG. II is an enlarged detail of the land clearing apparatus shown in FIG. I, showing the land clearing rasp from the same viewpoint as in FIG. I, with portions of the rasp being cut away to show detail, and an alternative embodiment of a guard being shown;

Figure 1:
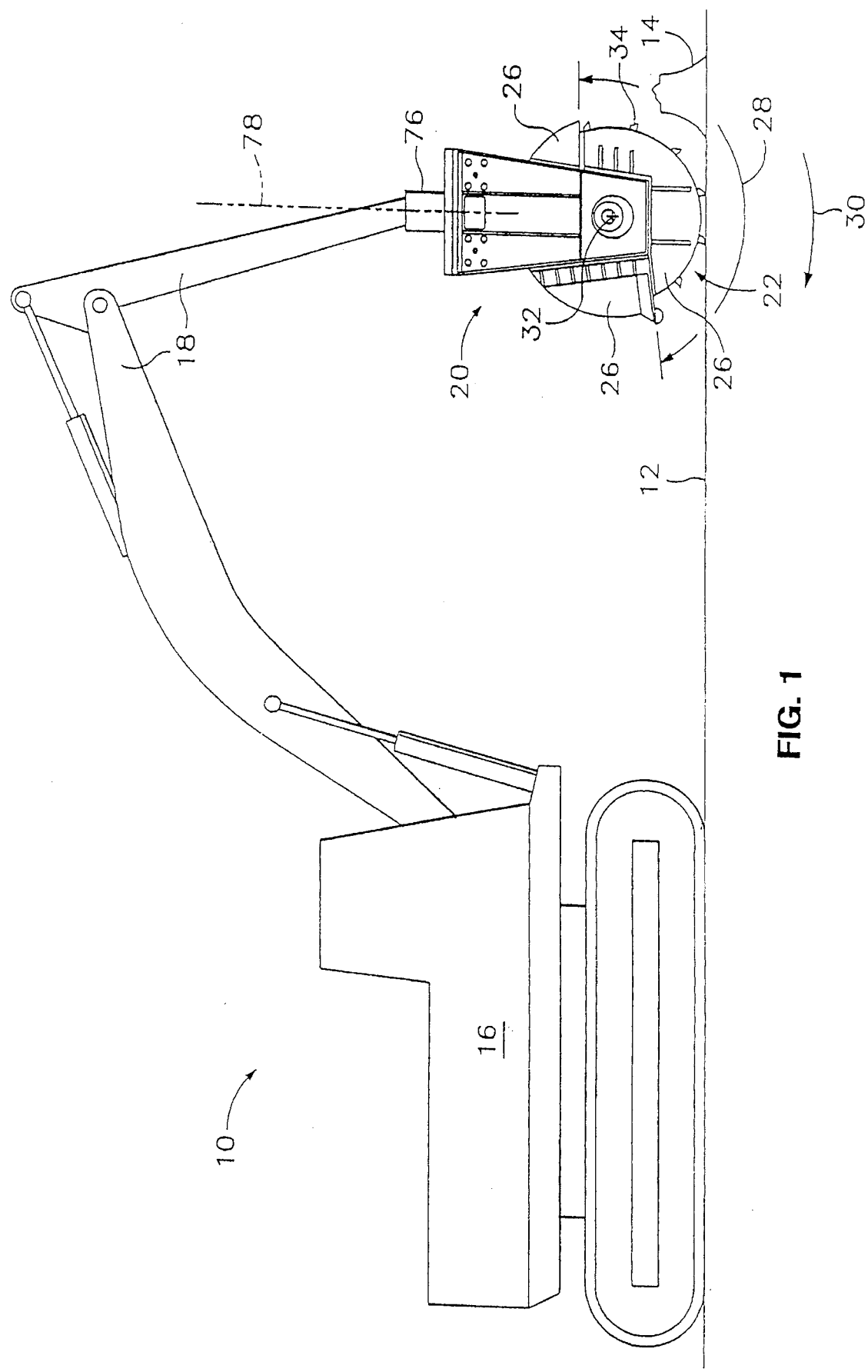
Figure 2:
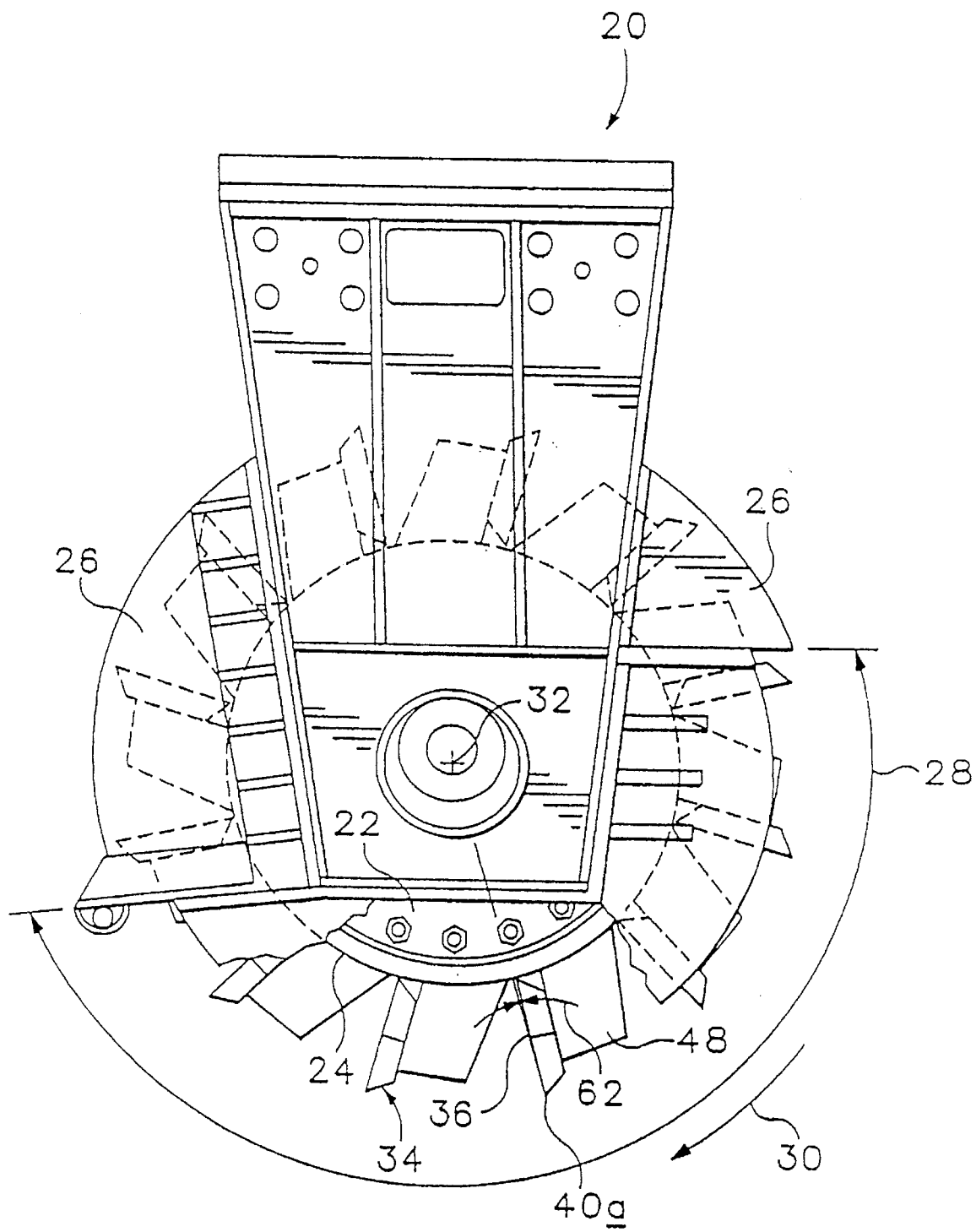
Figure 3:
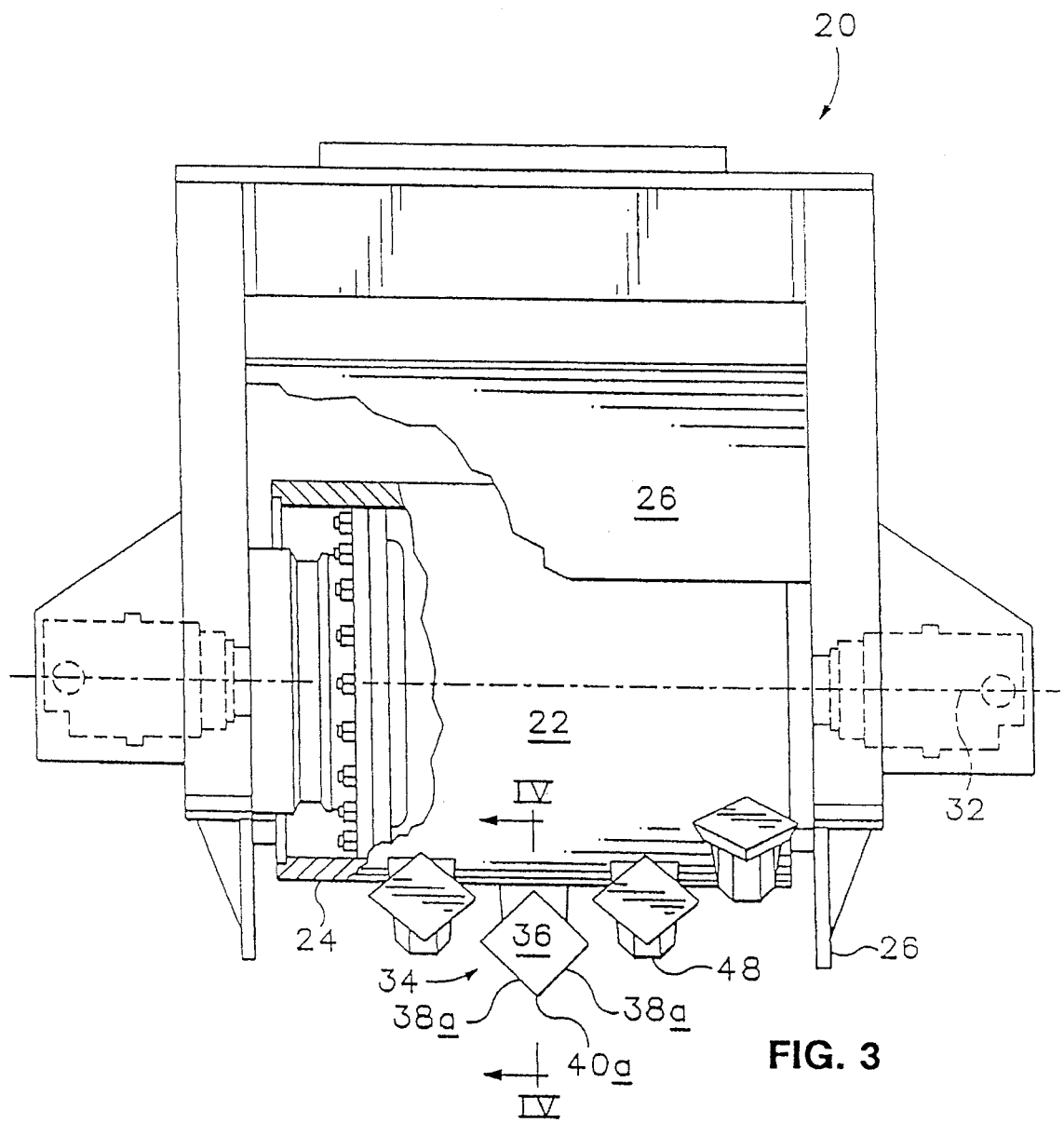
Figure 4:
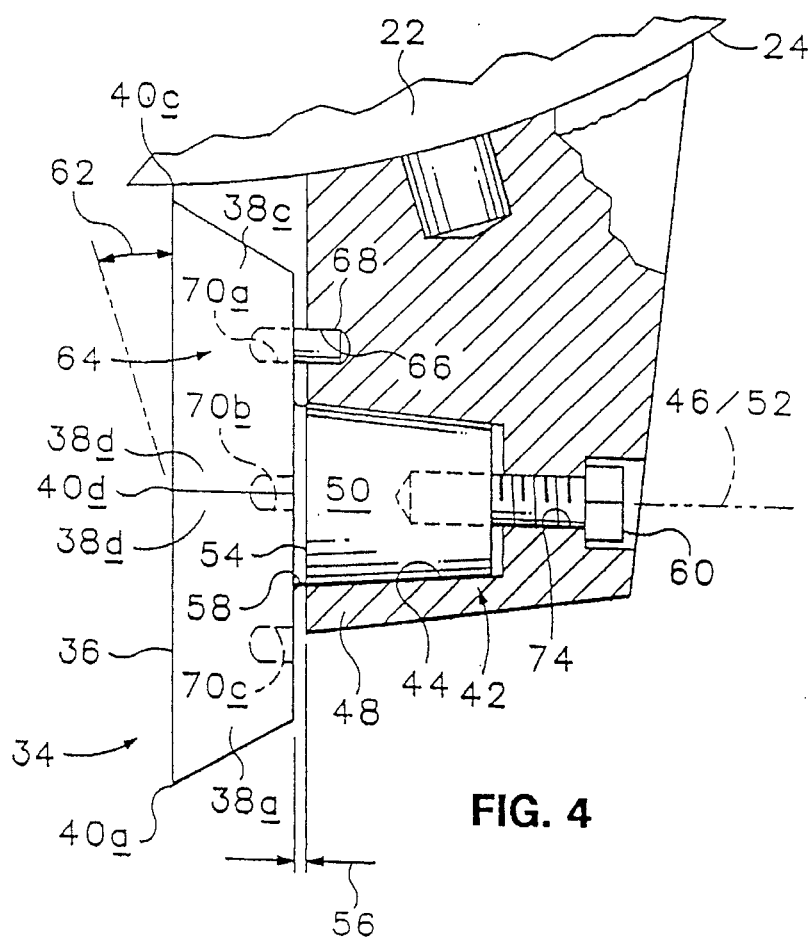
Figure 5:
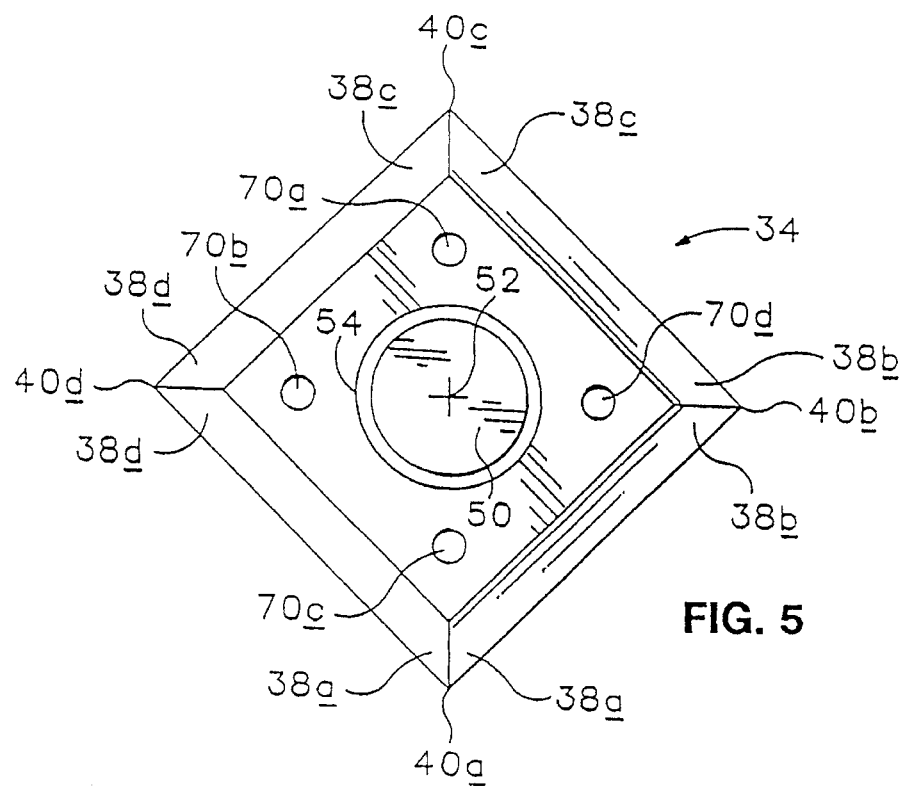
Figure 6:
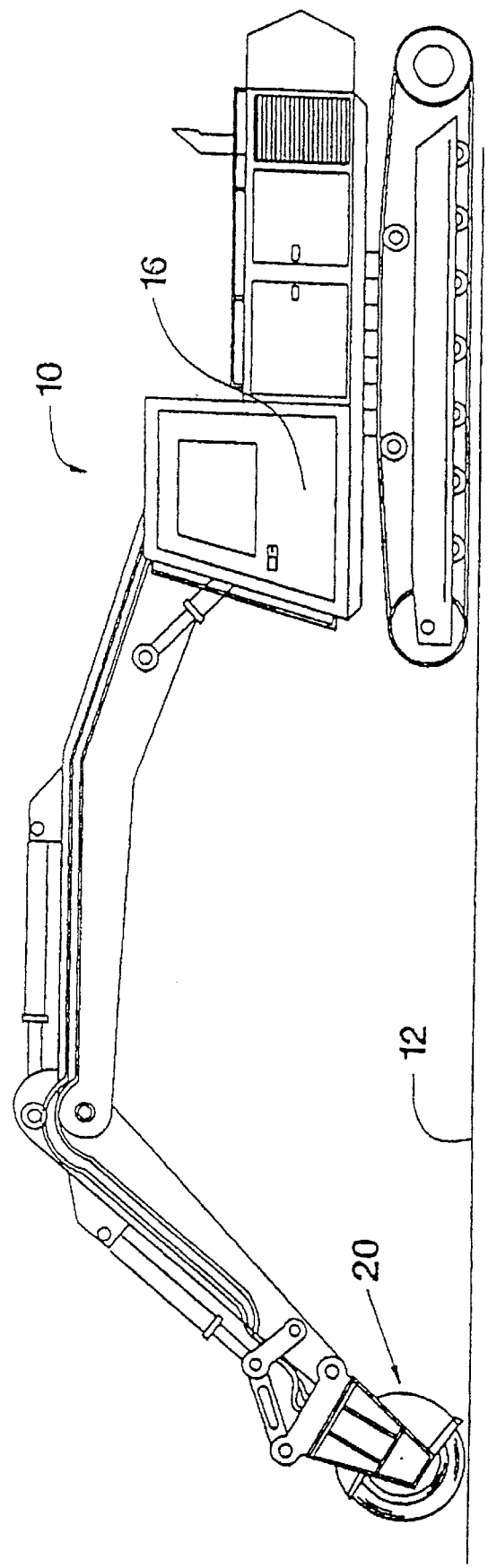
Figure 7:
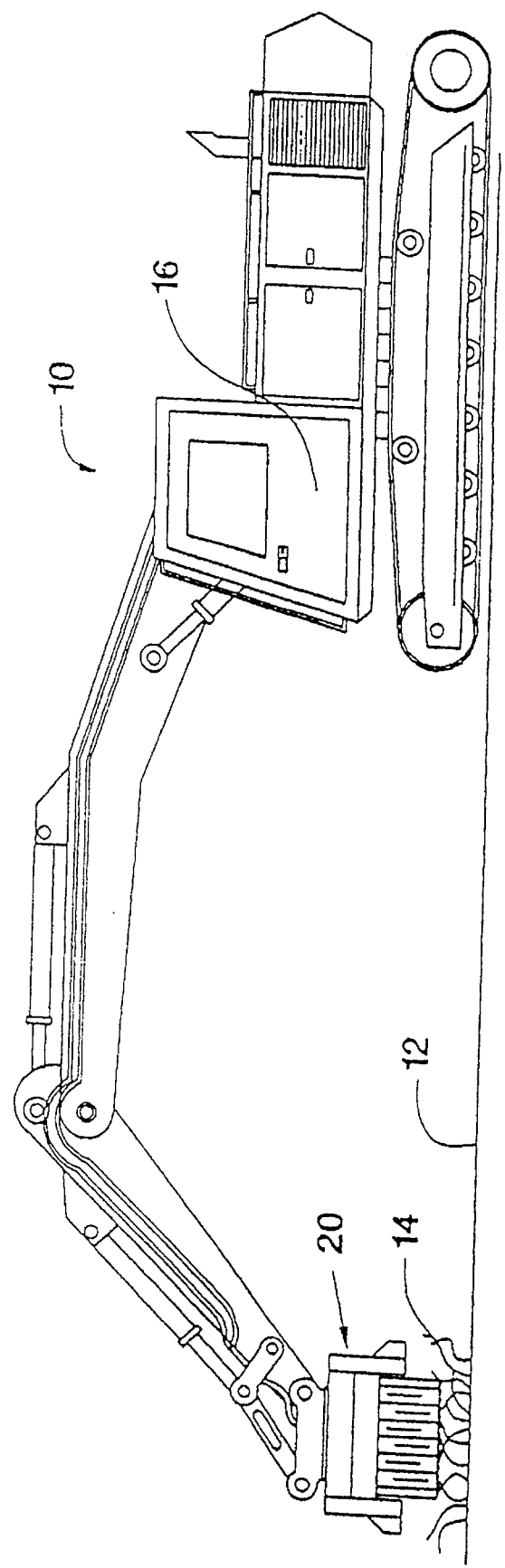
Figure 8:
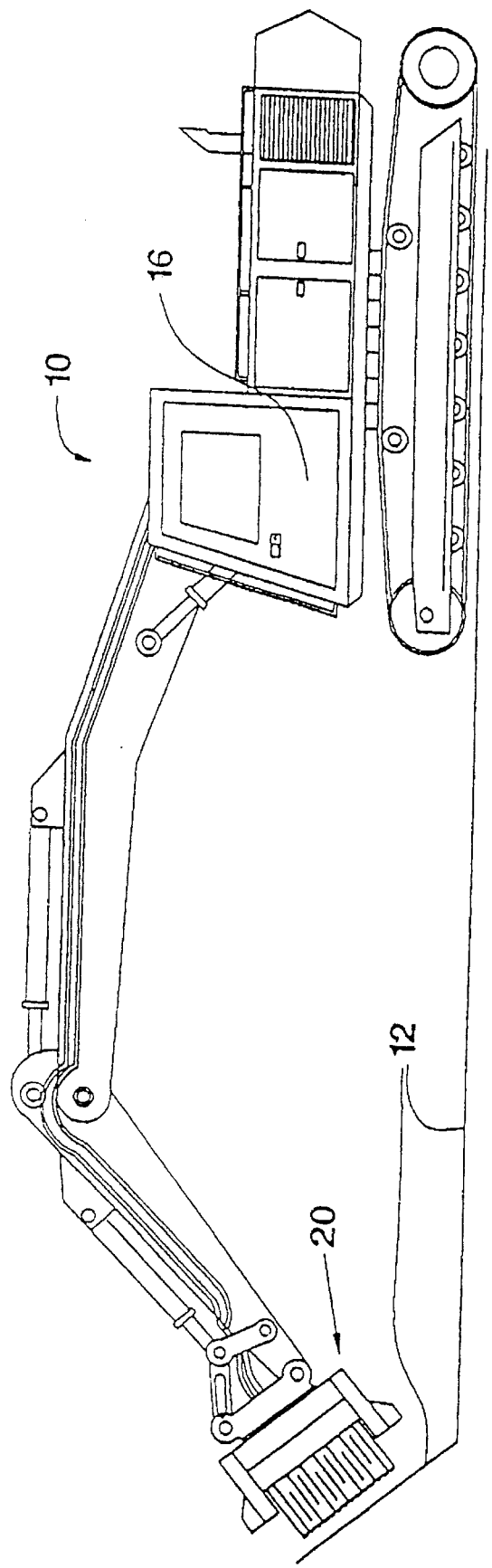
Figure 9:
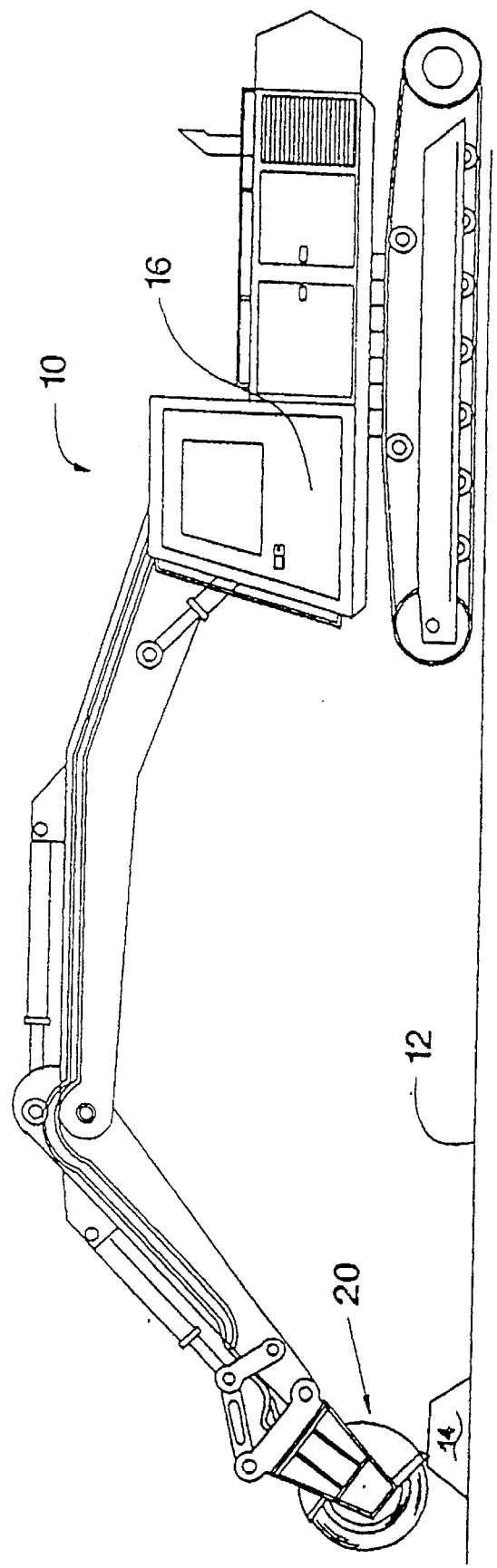
Figure 10:
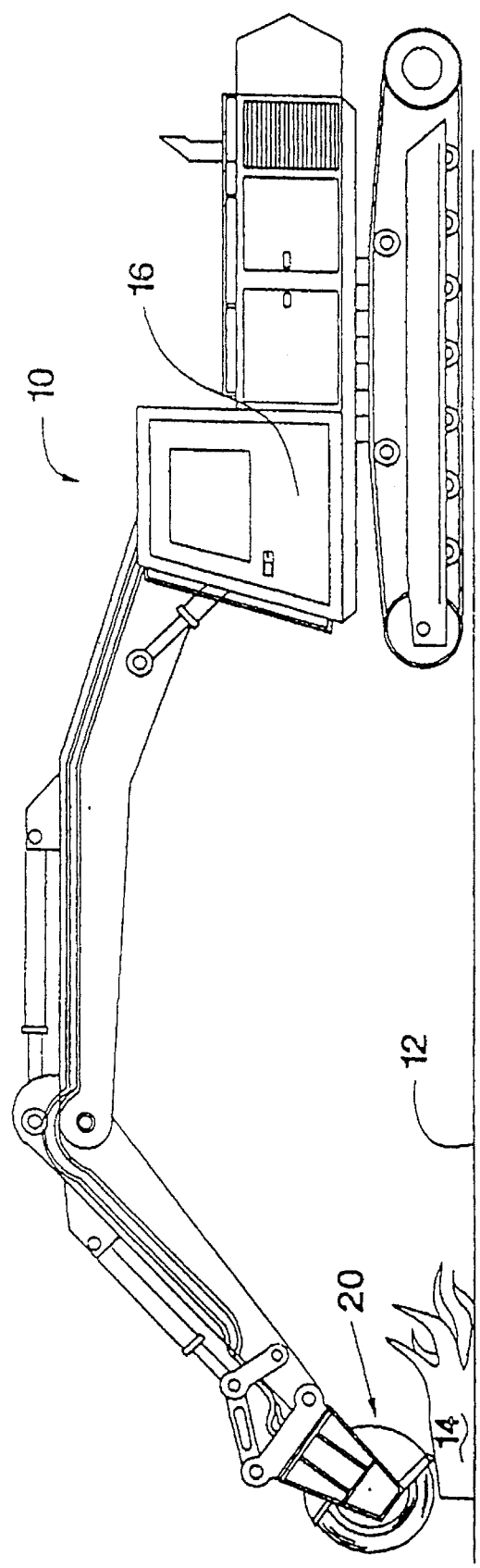
Figure 11:
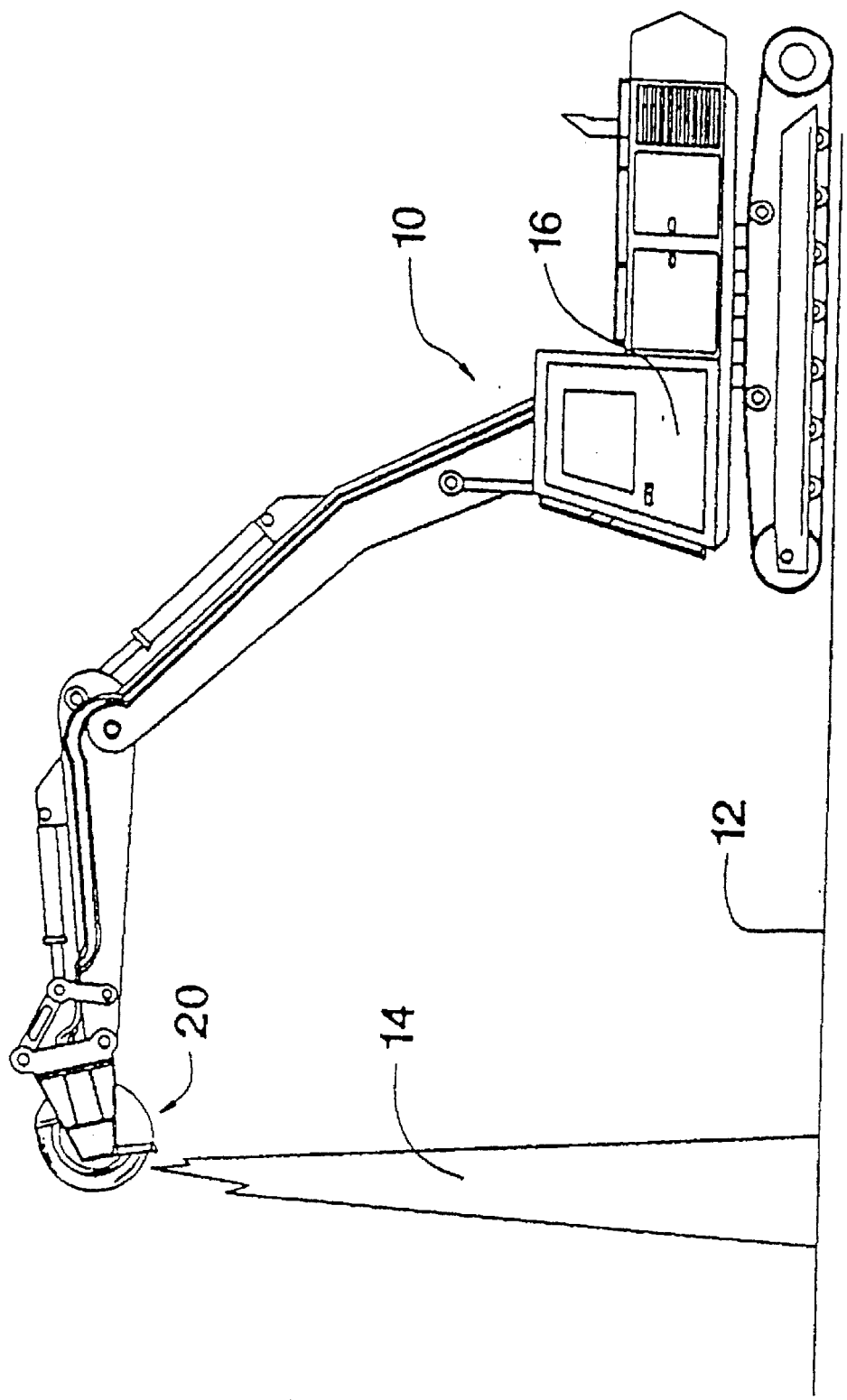

FIG. III is a rear elevation in approximately the same scale as FIG. II of the land clearing rasp shown in FIG. II, with the rasp being viewed form the left of FIG. II, with portions of the rasp being removed to show detail, and with only a single row of cutters being shown at the bottom of the rasp;

FIG. IV is further enlarged relative to Figs. II and III, showing a partial cross section of the center cutter shown in FIG. III, taken along line IV—IV in FIG. III;

FIG. V is an elevation of a tooth of a cutter in approximately the same scale as FIG. IV, showing the tooth isolated from the rest of the cutter and in a reverse angle from the teeth shown in FIG. III;

FIGS. VI through X, described separately below, show left side elevations of the apparatus shown in FIG. I, slightly reduced in scale relative to FIG. I, showing various operating positions and functions of the land clearing rasp of the apparatus;

FIG. VI shows the rasp being used to clear brush from land;

FIG. VII shows the rasp pivoted 90-degrees from the orientation shown in FIG. I, with the axis of the pivoting being contained in the plane of the drawing;

FIG. VIII shows the rasp reoriented relative to FIG. VII to accommodate sloped land;

FIG. IX shows the rasp oriented similarly to FIG. VI, and shredding a stump that is still attached to the land;

FIG. X shows the rasp as in FIG. IX, but shredding a stump that has been pulled out of the ground; and FIG. XI is a left side elevation similar to those shown in FIGS. VI through X, but on a further reduced scale, and with the excavator arm articulated to orient the rasp for shredding a standing tree.

DETAILED DESCRIPTION OF THE PREFERRED EMBODIMENT

Referring to FIG. I, a land clearing apparatus according to the present invention is shown generally at 10. Land to be cleared is indicated at 12 and an item to be operated on is indicated at 14. Apparatus 10 includes a land clearing machine 16, which in the preferred embodiment is an excavator that has an outwardly extending articulated arm 18. A land clearing rasp 20 is shown at the outer end of arm 18, with the land clearing rasp including a rotating member 22, more specifically a drum that is rotatably mounted on machine 16.

Drum 22 is shown most clearly in FIGS. II and III, and has a surface 24 that is the working surface of drum 22. Surface 24 is partially enclosed by a guard 26, thus creating a predefined region of engagement indicated generally at 28. Region of engagement 28 is that portion of drum 22 that is exposed for engagement with land 12. Drum 22 rotates in a normal direction of rotation indicated generally at 30 and has an axis of rotation indicated generally at 32.

Disposed about surface 24 of drum 22 are removable impact structures 34. In the preferred embodiment, impact structures 34 clear land 12 by impacting items such as item 14, and by cutting into such items. Thus, each impact structure 34 can be thought of as a tooth by which item 14 is cut.

As shown in detail in FIGS. IV and V, each impact structure 34 has an impact surface 36 that is substantially planar and that provides a surface for impacting items such as item 14. Impact surface 36 is defined by boundary structure 38 that includes cooperating pairs of boundary structure indicated generally at 38a, 38b, 38c and 38d, respectively. One such pair of boundary structure shapes impact structure 34 relative to drum 22 so that structure 34, when viewed along an axis normal to impact surface 36, tapers to a point progressing radially outward from axis of rotation 32 of drum 22. For example, such a view is shown in FIG. III, with boundary structure 38a tapering to vertex or point 40a located at the region of greatest radial extent of impact surface 36 relative to axis 32 of drum 22. The other vertexes or pairs of boundary structure provide other points, indicated in FIG. V as points 40b, 40c and 40d, associated with boundary structure 38b, 38c and 38d, respectively.

Focussing attention now on FIG. IV, impact structure 34 is attached to drum 22 at a predefined attachment point, indicated generally at 42, through which a motive force is directed. In the preferred embodiment, attachment point 42 is a socket 44 that has an axis 46, with socket 44 being formed in an adaptor 48 which is joined to drum 22. Coordinating with socket 44 is a post 50 that is joined to impact structure 34 and that interfits with socket 44 so that impact structure 34 can be attached to drum 22 at predefined attachment point 42 by inserting post 50 into socket 44.

Post 50 has a post axis 52, and preferably tapers relative to impact surface 36 such that the perimeter of the post decreases progressing away from impact surface 36. Thus, post 50 is in the shape of a frustum of a right circular cone. Referring to FIG. V, which shows the back of impact structure 34 with the post extending toward the viewer, the perimeter of post 50 is indicated generally at 54. Referring back to FIG. IV, it will be seen that perimeter 54 decreases as the point of view for the perimeter moves away from impact surface 36. More specifically, a first crosssection of the post, representing a cross-section of post 50 with the plane in which post 50 is cross-sectioned is about adjacent to impact surface 36 is indicated at 54a, and a second cross-section of the post, representing a cross-section of post 50 with the plane in which post 50 is cross-sectioned is about adjacent to the end of post 50 is indicated at 54b. Thus, it will be seen that post 50 tapers relative to impact surface 36 such that, when viewed along post axis 52, the perimeter of a cross-section of post 50 continually decreases as the plane in which post 50 is cross-sectioned moves from about adjacent to impact surface 36 to about adjacent to the end of post 50, as represented by cross-sections 54a to 54b. Post 50 and socket 44 are conformed to each other so that socket 44 is also frusto-conical. Furthermore, post 50 is slightly oversized relative to socket 44 so that a visible gap, indicated generally at 56, remains between impact structure 34 and drum 22 when post 50 is interfitted with socket 44. More specifically, gap 56 remains between the back face of impact structure 34 and the front face of adaptor 48. A marking 58 is provided on post 50, with marking 58 being visible within gap 56. In the preferred embodiment, marking 58 is an indented groove, and is formed on post 50 immediately adjacent the back face of impact structure 34.

When post 50 is interfitted with socket 44, impact structure 34 can be held in place on adaptor 48 by threading a bolt 60 into post 50. Socket 44, post 50 and bolt 60 cooperate to form what is referred to as joinder structure, by which impact structure 34 is attached to drum 22 at attachment point 42. Gap 56 provides a visual wear indicator that indicates the amount of wear in the joinder structure. Marking 58 facilitates this indication because any wear in the joinder structure is indicated by the disappearance of marking 58 into socket 44.

The joinder structure has an axis of alignment which corresponds to axes 46 and 52 of socket 44 and post 50, respectively. The axis of alignment of the joinder structure is the axis along which impact structure 34 is attached to and removed from drum 22. In the preferred embodiment, socket 44 is formed so that, when adaptor 48 is joined to drum 22, socket axis 46 is oriented relative to drum 22 to be about tangential to surface 24 of drum 22. Furthermore, post 50 is joined to impact structure 34 so that post axis 52 is about normal to impact surface 36. With this preferred configuration, it will be seen that the axis of alignment of the joinder structure is oriented relative to impact surface 36 to be about perpendicular to impact surface 36, and relative to attachment point 42 so that impact surface 36, with impact structure 34 attached to drum 22, faces normal direction of rotation 30 of drum 22.

In the preferred embodiment, socket axis 46 is slightly angled relative to surface 24 so that an acute angle, indicated at 62, is defined by a plane intersecting impact surface 36 and containing axis of rotation 32 of drum 22, with the acute angle ranging from about 10-degrees to about 25-degrees. Preferably, acute angle 62 is about 17-degrees. Thus, impact surface 36 is forwardly inclined relative to normal direction of rotation 30 of drum 22.

A stop is shown generally at 64, with stop 64 being operatively connected to impact structure 34 and drum 22 to orient impact structure 34 in a predefined fixed position relative to drum 22. Stop 64 preferably includes a hole 66 in adaptor 48, with hole 66 being offset relative to the joinder structure, more specifically relative to socket axis 46. A dowel 68 interfits with hole 66. Referring to FIG. V in conjunction with FIG. IV, holes 70a, 70b, 70c and 70d are formed in impact structure 34, and offset relative to the joinder structure, more specifically relative to post axis 52, so that one of the holes 70a, 70b, 70c or 70d can also be aligned with dowel 68. Dowel 68 can then be placed in hole 66, and the selected one of holes 70a, 70b, 70c or 70d can be interfitted with dowel 68.

For example, in FIG. IV, hole 70a has been aligned with dowel 68. This places point 40a at the region of greatest radial extent of impact surface 36 relative to drum 22. This placement is thus a predefined operating position of impact structure 34. Given the configuration of impact structure 34 shown in FIG. V, it will be seen that there are plural operating positions, with each operating position corresponding to holes 70a, 70h, 70c and 70d such that aligning one of these holes with dowel 68 and hole 66 places point 40a, 40b, 40c or 40d, respectively, at the region of greatest radial extent of impact surface 36 relative to drum 22. Each such operating position presents at least three points exposed for operable engagement, with the exposed points preferably defining a triangle as shown in FIG. III by points 40a, 4b and 40d. These operating positions provide field maintainability of rasp 20, because as a given point, for example point 40a, wears out, impact structure 34 can be removed from drum 22 and reoriented to place a different point, for example point 40b, into the desired position.

As an alternative to the frusto-conical joinder structure which is combined with a separate stop 64 to fix impact structure 36 relative to drum 22, as shown in the drawings, socket 44 and post 50 can be shaped so that there are only a limited number of interfitting orientations of post 50 relative to socket 44. For example, socket 44 and post 50 could be in the shape of frustums of right pyramids, not shown.

The removal of impact structure 34 can be accomplished in at least two ways. First, bolt 60 can be partially unthreaded relative to post 50, so that bolt 60 is not in direct contact with adaptor 48. Bolt 60 can then be struck with a suitable tool, for example a hammer, so that post 50 is knocked out of socket 44. Alternatively, bolt 60 can be removed from post 50 and a push rod can be engaged with post 50 to force post 50 out of socket 44. A simple way of providing such a push rod is to form a tap in adaptor 48 that is oversized relative to bolt 60. Such a tap is indicated generally at 74. A bolt is then threaded into tap 74 to engage post 50, thereby pushing post 50 out of socket 44 as the bolt is threaded into tap 74.

Returning to FIG. I, apparatus 10 includes a pivot, indicated generally at 76, with the pivot being mounted on machine 16, more specifically at the outer end of arm 18. Thus arm 18 and pivot 76 interconnect drum 22 to machine 16. Pivot 76 has a pivot axis 78 that is oriented to be about parallel to a plane that both contains axis of rotation 32 of drum 22 and generally bisects region of engagement 28 of drum 22. In the configuration shown in FIG. I, such a plane corresponds to a plane that extends perpendicularly out of the sheet of the drawing and contains pivot axis 78. Pivot axis 78 is also preferably oriented to be about perpendicular to axis of rotation 32 of drum 22, and more specifically, about intersecting with axis of rotation 32.

Pivot 18 allows more flexibility in the orientation of rasp 20. For example, one such orientation is the orientation shown in FIG. I, and a second orientation is shown in FIG. VII, where rasp 20 has been pivoted about pivot axis 78 90-degrees relative to the orientation shown in FIG. I.

From the foregoing description of elements, it will be seen that what has been described is a land clearing apparatus 10 that includes a land clearing rasp 20. Apparatus 10 clears land 12 by impacting items 14 with an impact structure 34 that is rotated on a rotating member 22. Impact structure 34 is removably joined to rotating member 22 by joinder structure that is designed to improve the durability and maintainability of the apparatus.

Furthermore, the combination of the articulations of arm 18 and the pivoting of pivot 76 allow rasp 20 to be used for clearing various items from land. For example, as shown in FIG. VI, rasp 20 is being used to clear brush in a linear fashion relative to machine 16. In FIG. VII, rasp 20 is shown clearing brush in an arcuate fashion relative to machine 16. In FIG. VIII, rasp 20 has been reoriented to accommodate sloped land. Rasp 20 can also be used to grind large items such as stumps, as shown in FIG. IX, with the stump being shown still embedded in the ground, and in FIG. X, with the stump being shown removed from the ground. Even larger items, such as trees, can be shredded with the rasp 20, as shown in FIG. XI.

Many aspects of apparatus 10 have not been described in detail. For example, drum 22 is rotated by a pair of hydraulic motors fed with pressurized hydraulic fluid from machine 16. A planetary gear box is interposed each motor and drum 22, and is cooled by dividing the hydraulic fluid coming from machine 16 with a manifold, and supplying the divided fluid simultaneously to the motors and the gear box. As another example, guard 26 can have interchangeable portions that change the size of region of engagement 28, or that selectively duct the discharge of material from rasp 20. A change in the size of region of engagement 28 limits the pattern of discharged material, which is useful when using apparatus 10 in inhabited areas. The selective ducting of the discharged material could be to a vacuum and receptacle, thereby collecting much of the discharged material. Yet another example is that pivoting about pivot 76 can be hydraulically actuated, and a locking mechanism can lock pivot 76 in a given selected position.

INDUSTRIAL APPLICABILITY

The land clearing apparatus of the present invention is applicable in any situation in which it is desired to clear land of vegetation or debris or otherwise prepare land for use. It is particularly applicable to clearing trees and brush from remote, rugged terrain.

While a preferred embodiment of the invented land clearing apparatus has been disclosed, changes and modifications can be made without departing from the spirit of the invention.

I claim:

1. A land clearing apparatus comprising:

a rotating member having an axis of rotation and a predefined attachment point through which a motive force is directed; and removable impact structure attached to the rotating member at the attachment point by joinder structure, the impact structure having a substantially planar impact surface, and the joinder structure having an axis of alignment along which the impact structure is attached to and removed from the rotating member, with the axis of alignment being oriented relative to the impact surface to be about perpendicular to the impact surface and relative to the attachment point so that the impact surface, with the impact structure attached to the rotating member, faces the normal direction of rotation of the rotating member.

2. The land clearing apparatus according to claim 1, wherein the joinder structure includes an interfitting post and socket.

3. The land clearing apparatus according to claim 2, wherein the post is joined to the impact structure and the socket is joined to the rotating member.

4. The land clearing apparatus according to claim 3, wherein the post tapers relative to the impact surface so that the perimeter of the post decreases progressing away from the impact surface.

5. The land clearing apparatus according to claim 4, wherein the socket is conformed to the post.

6. The land clearing apparatus according to claim 5, wherein the post is substantially in the shape of a frustum of a right circular cone.

7. The land clearing apparatus according to claim 1, wherein the joinder structure further includes a visual wear indicator that indicates the amount of wear in the joinder structure.

8. The land clearing apparatus according to claim 7, wherein:

the joinder structure includes an interfitting post and socket;

the wear indicator includes a visible gap that remains between the impact structure and the rotating member when the post is interfitted with the socket, and a marking on the post that is visible within the gap so that any wear in the joinder structure is indicated by the disappearance of the marking into the socket.

9. The land clearing apparatus according to claim 1, further comprising:
- a land clearing machine for transporting the rotating member relative to the land being cleared; and
- a pivot mounted on the machine and interconnecting the rotating member to the machine, wherein the rotating member has a predefined region of engagement that is exposed for engagement with land to be cleared, and the pivot has a pivot axis, with the pivot axis being oriented to be about parallel to a plane that both contains the axis of rotation of the rotating member and generally bisects the region of engagement of the rotating member, with the pivot axis also being oriented to be about perpendicular to the axis of rotation of the rotating member.

10. The land clearing apparatus according to claim 1, further comprising:
- a land clearing machine for transporting the rotating member relative to the land being cleared; and
- a pivot mounted on the machine and interconnecting the rotating member to the machine, the pivot having a pivot axis about perpendicular to and about intersecting with the axis of rotation of the rotating member.

11. The land clearing apparatus according to claim 1, further comprising a guard for partially enclosing the rotating member.

12. The land clearing apparatus according to claim 1, wherein the impact surface is forwardly inclined relative to the normal direction of rotation of the rotating member to define an acute angle with respect to a plane intersecting the impact surface and containing the axis of rotation of the rotating member.

13. The land clearing apparatus according to claim 12, wherein the acute angle defined by a plane intersecting the impact surface and containing the axis of rotation of the rotating member ranges from about 10-degrees to about 25-degrees.

14. The land clearing apparatus of claim 1, wherein the impact structure is tapered relative to the rotating member to define a singular point that is located at the region of greatest radial extent of the impact surface.

15. The land clearing apparatus of claim 14, wherein the impact surface, when viewed along an axis normal to the impact surface, is defined by boundary structure that tapers to a point progressing radially outward from the axis of rotation.

16. The land clearing apparatus according to claim 1, further comprising a stop operatively connected to the impact structure and the rotating member, wherein the impact structure has plural operating positions, and the stop orients the impact structure so that a selected one of the operating positions is in a predefined fixed position relative to the rotating member.

17. A land clearing rasp for use on an excavator, comprising:
- a drum rotatably mounted on the excavator and having an axis of rotation;
- an adaptor joined to the drum and having a socket formed therein, the socket being oriented relative to the drum to be about tangential to the surface of the drum; and
- a tooth having an impact surface and a post, the post extending away from the impact surface and the tooth being attached to the drum by inserting the post into the socket so that the impact surface faces the normal direction of rotation of the drum;
- wherein the post has a longitudinal post axis and an end distant from the impact surface, and the post tapers relative to the impact surface such that, when viewed along the post axis, the perimeter of a cross-section of the post continually decreases as the plane in which the post is cross-sectioned moves from about adjacent to the impact surface to about adjacent to the end of the post.

18. The land clearing rasp according to claim 17, wherein the post is substantially in the shape of a frustum of a right circular cone.

19. The land clearing rasp according to claim 17, wherein the tooth has plural operating positions, and a stop operatively connects the tooth to the drum to orient the tooth so that a selected one of the operating positions is in a predefined fixed position relative to the drum.

20. The land clearing rasp according to claim 17, wherein the impact surface is substantially planar and is forwardly inclined relative to the normal direction of rotation of the drum to define an acute angle with respect to a plane intersecting the impact surface and containing the axis of rotation of the drum.

21. The land clearing rasp according to claim 20, wherein the acute angle defined by a plane intersecting the impact surface and containing the axis of rotation of the rotating member ranges from about 10-degrees to about 25-degrees.

22. A land clearing apparatus comprising:
- a rotating member through which a motive force is directed;
- an impact structure attached to the rotating member by releasable joinder structure and having plural operating positions, each operating position presenting at least three vertexes exposed for operable engagement; and a stop operatively connected to the rotating member and the impact structure for orienting the impact structure so that a selected one of the operating positions is in a predefined fixed position relative to the rotating member.

23. The land clearing apparatus according to claim 22, wherein the three exposed points define a triangle.

24. The land clearing apparatus according to claim 22, wherein the stop includes an interfitting dowel and hole offset relative to the joinder structure.

25. The land clearing apparatus according to claim 22, wherein the joinder structure includes a socket joined to the rotating member and an interfitting post joined to the impact structure, with the socket and post being shaped to allow a limited number of orientations of the impact surface relative to the rotating member, thereby providing the plural operating positions and the stop.

26. A land clearing apparatus comprising:
- a rotating member through which a motive force is directed;
- an impact structure attached to the rotating member by releasable joinder structure in the form of an interfitting post and socket; and
- a wear indicator that visually indicates the amount of wear in the joinder structure, the wear indicator including a visible gap that remains between the impact structure and the rotating member when the post is interfitted with the socket, so that any wear in the joinder structure is indicated by a change in the gap.

27. The land clearing apparatus according to claim 26, wherein:
- the joinder structure includes a post joined to and extending away from the impact structure that interfits with a socket joined to the rotating member, with the post and socket being tapered and conformal such that, when the impact structure is connected to the rotating member, a visible gap remains between the impact structure and the rotating member; and the wear indicator includes a marking on the post that is visible within the gap, so that wear to the joinder structure is indicated by the disappearance of the marking into the socket.

28. The land clearing apparatus according to claim 27, wherein the marking includes an indented groove formed on the post adjacent the impact structure.

29. A land clearing apparatus, comprising:

a rotatable drum having an axis of rotation;

impact structure joined to the drum so that rotating the drum also rotates the impact structure;

a land clearing machine for transporting the drum relative to the land being cleared;

an arm extending outwardly from the machine; and a pivot mounted on the arm and interconnecting the drum to the machine, wherein the drum has a predefined region of engagement that is exposed for engagement with land to be cleared, and the pivot has a pivot axis, with the pivot axis being oriented to be about parallel to a plane that both contains the axis of rotation of the drum and generally bisects the region of engagement of the drum, with the pivot axis also being oriented to be about perpendicular to the axis of rotation of the drum.

30. The land clearing apparatus according to claim 29, wherein the pivot axis is about perpendicular to and about intersecting with the axis of rotation of the drum.

* * * * *